United States Patent
Nakayasu et al.

(12) 
(10) Patent No.: US 6,896,338 B2
(45) Date of Patent: May 24, 2005

(54) HYDRAULIC BRAKING SYSTEM FEATURING SELECTABLE INCREASED PUMP FLOW

(75) Inventors: Yuji Nakayasu, Troy, MI (US); John T. Truax, Washington Township, MI (US)

(73) Assignee: Continental Teves Inc., Auburn Hills, MI (US)

( * ) Notice: Subject to any disclaimer, the term of this patent is extended or adjusted under 35 U.S.C. 154(b) by 0 days.

(21) Appl. No.: 10/418,376

(22) Filed: Apr. 18, 2003

(65) Prior Publication Data

US 2004/0207253 A1 Oct. 21, 2004

(51) Int. Cl.⁷ .............................. B60T 8/40; B60T 8/88
(52) U.S. Cl. ............................. 303/116.1; 303/122.09; 303/113.1; 303/9
(58) Field of Search .................. 303/113.1, 113.2, 303/113.3, 113.5, 116.1, 119.1, 9, 9.61, 9.63, 122, 122.01, 122.02, 122.03, 122.09, 122.12, 122.13, 122.14; 188/152

(56) References Cited

U.S. PATENT DOCUMENTS 4,824,183 A * 4/1989 Uchida et al. ............ 303/113.5
5,540,488 A    7/1996 Terazawa et al.
6,120,111 A * 9/2000 Sakai ....................... 303/116.1

* cited by examiner

Primary Examiner—Thomas Williams

(57) ABSTRACT

An automotive braking system controls the flow of pressurized brake fluid from a tandem master cylinder to several wheel brakes via a pair of braking circuits. Each circuit features a pressure relief line having, in series, a normally-closed valve, low-pressure accumulator, pump, check valve, damping chamber, and throttling orifice. A bypass line includes a normally-closed bypass valve that is operated to interconnect the pressure relief lines of the first and second braking circuits downstream of the pump outlets to thereby reduce system response time when, for example, one or more wheel brakes are actuated to enhance vehicle traction or stability. Braking system redundancy is enhanced with a check valve incorporated in either or both circuits downstream of the bypass connection, or a second normally-closed bypass valve in the bypass line. Fluid pressure monitoring in either or both circuits is further useful in identifying bypass valve leakage.

23 Claims, 5 Drawing Sheets

HYDRAULIC BRAKING SYSTEM FEATURING SELECTABLE INCREASED PUMP FLOW

FIELD OF THE INVENTION

The invention relates to dual-circuit hydraulic braking systems for a motor vehicle that are controlled to enhance vehicle traction or stability.

BACKGROUND OF THE INVENTION

Modern dual-circuit hydraulic braking systems for automotive applications typically include an operator-actuated brake actuation unit, such as a tandem master cylinder actuated by a booster-aided brake pedal, by which to supply a first pressurized fluid to each of a first pair of wheel brakes via a first or "primary" braking circuit, and a second pressurized fluid to each of a second pair of wheel brakes via a second or "secondary" braking circuit. The use of wholly redundant braking circuits for operating discrete pairs of wheel brakes ensures continued vehicle braking capability, notwithstanding a degradation of performance of the one of the braking circuits.

In order to achieve an "anti-lock" braking system, each braking circuit often features a normally-open electrically-operated inlet valve controlling the flow of pressurized fluid to each wheel brake, while a pressure relief line that includes a normally-closed electrically-operated outlet valve, a return pump, and a check valve controls the return of pressurized fluid from the wheel brake to the brake line upstream of the inlet valve. A "separation" or "isolation" valve, located in the brake line of each circuit upstream of the location at which the pressure relief line connects to the brake line, serves to isolate the brake line from the master cylinder during anti-lock operation.

Increasingly, such anti-lock braking systems are used in combination with wheel speed sensors in a traction control mode. The further addition of a steering angle sensor, a vehicle yaw rate sensor, and a lateral vehicle acceleration sensor enables such anti-lock braking systems to operate in an "electronic stability control" mode, wherein a braking system controller selectively energizes each circuit's electrically-operated valves when the controller identifies an opportunity to enhance vehicle stability through a selective application of the vehicle's brakes.

In order to control the fluid pressure in traction control or vehicle stability control modes, a hydraulic pump is typically placed in the pressure relief line of each circuit downstream of the outlet valve to return pressurized fluid to the circuit's brake line. The pump also serves to provide an increasing rate of fluid pressure upon the closing of the isolation valve to provide a sufficient braking system response time when operating in a traction control mode, even at a time when the brake fluid has a relatively-high viscosity due, for example, to low brake fluid temperatures.

The prior art has recognized, however, that a quicker system response is desirable when the braking system is operated in a vehicle stability control mode. By way of example, a rapid pressure build up in one or the other braking circuit is particularly desirable upon commencing vehicle stability control in order to correct oversteer or understeer conditions. Accordingly, the prior art teaches the addition of a braking circuit pre-charging function to the brake actuation unit, i.e., to the vacuum booster of the master cylinder, in order to increase system response at the time such vehicle stability control is commenced. Alternatively, an additional pre-charging pump is provided in one or both braking circuits to ensure a sufficient increasing rate of fluid pressure at the commencement of vehicle stability control enhancement.

Unfortunately, the addition of the pre-charge function to the master cylinder, or of an additional pre-charging pump to one or both braking circuits, adds significant cost, weight, and complexity to the braking system.

SUMMARY OF THE INVENTION

It is an object of the invention to provide a hydraulic braking system that provides a rapid pressure build-up of hydraulic fluid, for example, for use with a vehicle traction or stability control feature, that overcomes the deficiencies of the prior art.

It is also an object of the invention to provide a hydraulic braking system that features an increased system response relative to braking systems incorporating a pre-charging function when the brake fluid has a relatively-high fluid viscosity, as when brake fluid temperature is low.

A further object of the invention is to provide a method for providing a rapid build-up of hydraulic pressure in a selected braking circuit of a dual-circuit braking system upon operation of the selected braking circuit's isolation valve.

Yet another object of the invention is to provide a method of operating a hydraulic braking system to provide an improved system response time, for example, when the braking system is operated to enhance vehicle traction or stability.

In accordance with the invention, a dual-circuit hydraulic braking system includes a shunt or bypass line that interconnects the system's primary and secondary braking circuits downstream of both an isolation valve disposed in each circuit's brake line, and the outlet of a pump disposed in each circuit's pressure relief line. A normally-closed electrically-operated bypass valve disposed in the bypass line is operated by a system controller to interconnect the braking circuits and allow pressurized fluid from one braking circuit to flow into the other braking circuit, for example, when the controller identifies the desirability of quickly building up hydraulic pressure in one or both of the other circuit's wheel brakes during a vehicle traction control or stability control mode of system operation.

In accordance with an aspect of the invention, braking system redundancy is enhanced when interconnecting the braking circuits by placing a check valve in each braking circuit immediately downstream of the bypass location. Alternatively, braking system redundancy is achieved through placement of a check valve in one braking circuit's brake line immediately downstream of the bypass location, in combination with use of a pressure transducer that senses a fluid pressure achieved in the other braking circuit at a point downstream of both the isolation valve and the pump outlet. In a further alternative for enhancing braking system redundancy, a second normally-closed electrically-operated bypass valve is disposed in the bypass line.

In accordance with another aspect of the invention, each bypass valve disposed in the bypass line preferably features a valve element that is hydraulically biased to a sealing position when a fluid pressure achieved at the bypass location on one braking circuit is greater than a fluid pressure achieved at the bypass location on the other braking circuit.

In accordance with another aspect of the invention, a method for operating a dual-circuit hydraulic braking system includes interconnecting the system's primary and secondary braking circuits downstream of both an isolation valve disposed in each circuit's brake line, and the outlet of a pump disposed in each circuit's pressure relief line. In an exemplary method, interconnecting the braking circuits includes opening a normally-closed electrically-operated bypass valve disposed in the bypass line is operated by a system controller to interconnect the braking circuits and allow pressurized fluid from one braking circuit to flow into the other braking circuit, for example, when the controller identifies the desirability of quickly building up hydraulic pressure in one or both of the other circuit's wheel brakes during a vehicle traction control or stability control mode of system operation.

In accordance with an aspect of the invention, braking system redundancy is enhanced when interconnecting the braking circuits by placing a check valve in each braking circuit immediately downstream of the bypass location. Alternatively, system redundancy is achieved through placement of a check valve in one braking circuit's brake line immediately downstream of the bypass location, in combination with use of a pressure transducer that senses a fluid pressure achieved in the other braking circuit at a point downstream of both the isolation valve and the pump outlet.

Additional features, benefits, and advantages of the invention will become apparent to those skilled in the art to which the invention relates from the subsequent description of several exemplary embodiments and the appended claims, taken in conjunction with the accompanying Drawings.

BRIEF DESCRIPTION OF THE DRAWINGS

Referring to the Drawings, wherein like reference numerals are used to designate like components within each of the several views.

DETAILED DESCRIPTION OF THE INVENTION

Figure 1:
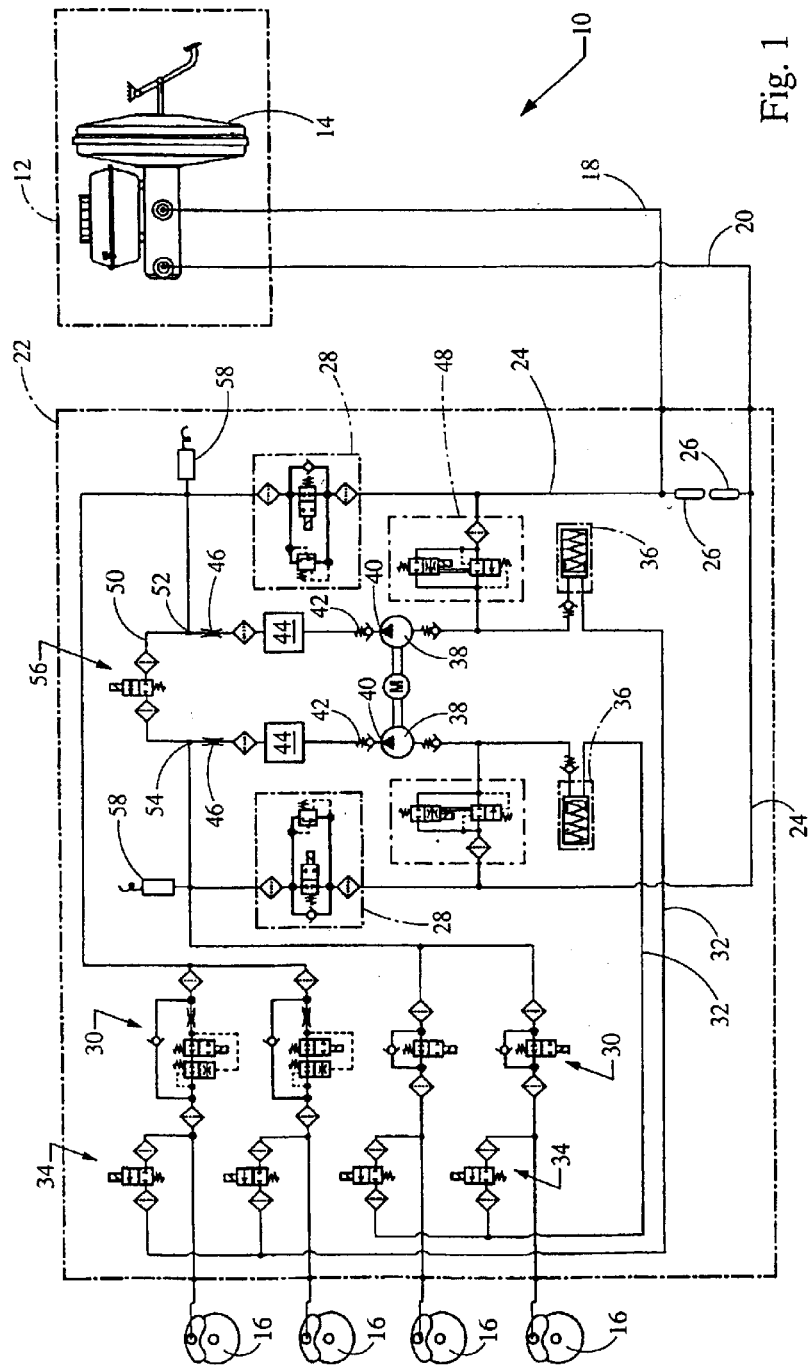
FIG. 1 is a schematic view of a first exemplary braking system in accordance with the invention in which a bypass line with a normally-closed electrically-operated valve interconnects the pressure relief lines of the unit's primary and secondary braking circuits.

Referring to FIG. 1, a first exemplary hydraulic braking system 10 in accordance with the invention controls the flow of pressurized brake fluid from a brake actuation unit 12, such as a pedal-operated tandem master cylinder 14 that includes a vacuum brake booster by which to amplify the applied pedal force, to several wheel brakes 16 via a pair of braking circuits 18,20 conveniently housed within a hydraulic control unit 22. Specifically, each braking circuit 18,20 features a brake line 24 that receives pressurized fluid from the master cylinder 14 through a pulsation damper 26. Each brake line 24 includes a normally-open electrically-operated solation valve 28 whose operation is controlled by a system controller (not shown). Each brake line 24 is also selectively connected to each of a pair of wheel brakes 16 through a dedicated normally-open electrically-operated inlet valve 30, also operated by the system controller, to achieve anti-lock vehicle braking, vehicle traction control, and/or vehicle electronic stability control.

As seen in FIG. 1, each braking circuit 18,20 of the first braking system 10 also features a pressure relief line 32 that selectively receives pressurized fluid from each of the braking circuit's wheel brakes 16 through a respective, dedicated normally-closed electrically-operated outlet valve 34, similarly under microprocessor control. The pressure relief line 32 is connected to the brake line 24 between the isolation valve 28 and the wheel brake inlet valves 30, and further typically includes a reservoir or low-pressure accumulator 36, a pump 38 having an outlet 40, and a check valve 42 for preventing reverse fluid flow through the pump 38.

Each pressure relief line 32 also includes a damping chamber 44 and a throttling orifice 46, each located downstream of the pump outlet 40, which operate to smooth fluid pressure spikes in the brake line 24. A normally-closed electronic shuttle valve 48 controls the flow of brake fluid from the brake line 24 upstream of the isolation valve 28 to the suction side of the pump 38.

In accordance with the invention, the first braking system 10 further includes a bypass line 50 interconnecting the pressure relief lines 32 of the first and second braking circuits 18,20 at a respective bypass location 52,54 on each braking circuit 18,20 downstream of the pump outlet 40. The bypass line 50 includes a normally-closed electrically-operated bypass valve 56. When the controller opens the bypass valve 56, the pump output of one braking circuit (for example, the first braking circuit 18) is allowed to flow through the bypass line 50 to augment the pump output of the other braking circuit (for example, the second braking circuit 20) and, hence, reduce system response time when, for example, one or more wheel brakes 16 of the other braking circuit (here, the second braking circuit 20) are actuated to enhance vehicle traction or stability.

Referring again to FIG. 1, the first braking system 10 further includes a pressure transducer 58 coupled to each braking circuit 18,20 at a location on the respective braking circuit 18,20 downstream of the isolation valve 28, and between the pump outlet 40 and the inlet valves 30. By way of example, in the first braking system 10, the pressure transducer 58 is located in the pressure relief line 32 downstream of the damping chamber 44 and throttling orifice 46, each of which serves to "smooth" pressure spikes that may be generated at the pump outlet 40.

The pressure transducers 58 detect the fluid pressure achieved at the respective locations on the braking circuits 18,20, preferably after the controller has deenergized the bypass valve 56 to thereby return the bypass valve 56 to a closed condition, to facilitate identification by the controller of any instance of bypass valve leakage. As a further benefit, such fluid pressure monitoring within each of the braking circuits 18,20 facilitates avoidance of unnecessarily high pressure in the hydraulic control unit 22 and, hence, is useful in improving the durability of the first braking system 10.

In operation, when the controller determines that additional fluid flow in one or the other braking circuits 18,20 is desirable, for example, when the controller determines that an actuation of one or more wheel brakes 16 is desirable to enhance vehicle traction or stability control, the controller closes the isolation valves 28 and then opens the bypass valve 56 to interconnect the two braking circuits 18,20 at the respective bypass locations 52,54. Thus interconnected, the pump output from one braking circuit 18,20 is allowed to flow into the other braking circuit 18,20 to rapidly build up fluid pressure at one or two specific wheel brakes 16. And, under optimal conditions of identical braking circuit suction-side resistance and the pump/motor size, the pump flow delivered to the selected wheel brakes 16 during interconnection of the braking circuits 18,20 will be twice that of an isolated braking circuit 18,20.

Still further, as a further benefit of the invention, such interconnection of the two braking circuits 18,20 during a traction control mode advantageously serves to reduce pump-generated pressure spikes in the brake lines 24, thereby improving braking system noise, vibration and harshness (NVH) levels.

Figure 2:
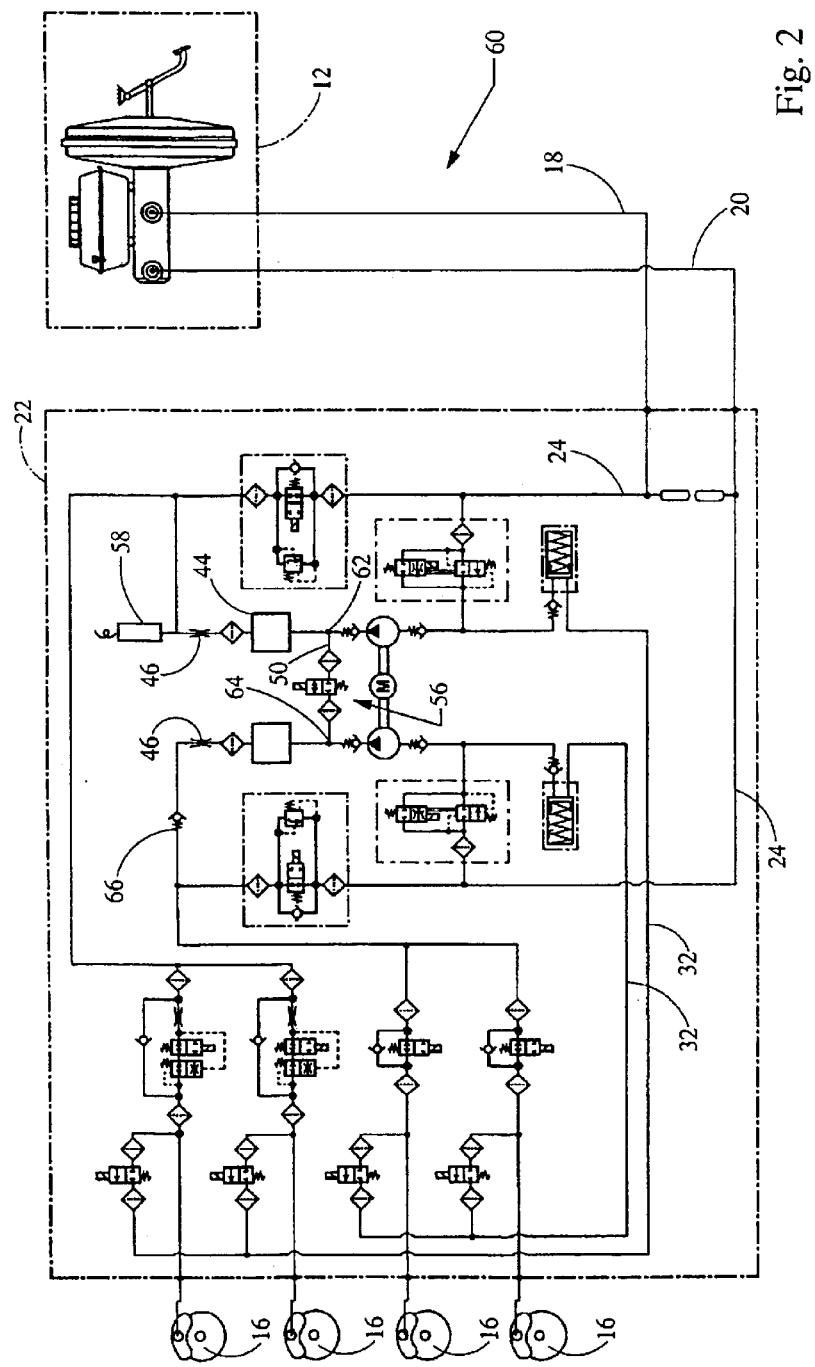
FIG. 2 is a schematic view of a second exemplary braking system in accordance with the invention in which the circuit-shunting bypass line interconnects the braking circuits at a bypass location on each braking circuit that is upstream of the pressure relief line's damping chamber, with each pressure relief lines further including an additional check valve to enhance braking system redundancy.

Referring now to FIG. 2, a second exemplary braking system 60, includes a pair of braking systems 18,20, the pressure relief lines 32 of which are interconnected by a bypass line 50 at a respective bypass location 62,64 on each braking circuit 18,20 immediately downstream of the pump outlet 40, and upstream of the damping chamber 44 and throttling orifice 46. As in the first braking circuit 10, a normally-closed bypass valve 56 is disposed in the bypass line 50 to allow the controller to selectively interconnect the pressure relief lines 32 of the two braking circuits 18,20 to thereby provide rapid fluid pressure build-up and increased fluid flow in a selected braking circuit 18,20.

A pressure transducer 58 senses the fluid pressure achieved in the first braking circuit 18 upon closure of the bypass valve 56, while a check valve 66 is disposed in the second braking circuit 20 operates to ensure continued functionality of the second braking circuit 20, notwithstanding a leakage of fluid through a "closed" bypass valve 56. By way of example only, in the second braking circuit 60, the check valve 66 is placed on the pressure relief line 32 of the second circuit 20, downstream of the throttling orifice 46.

Figure 3:
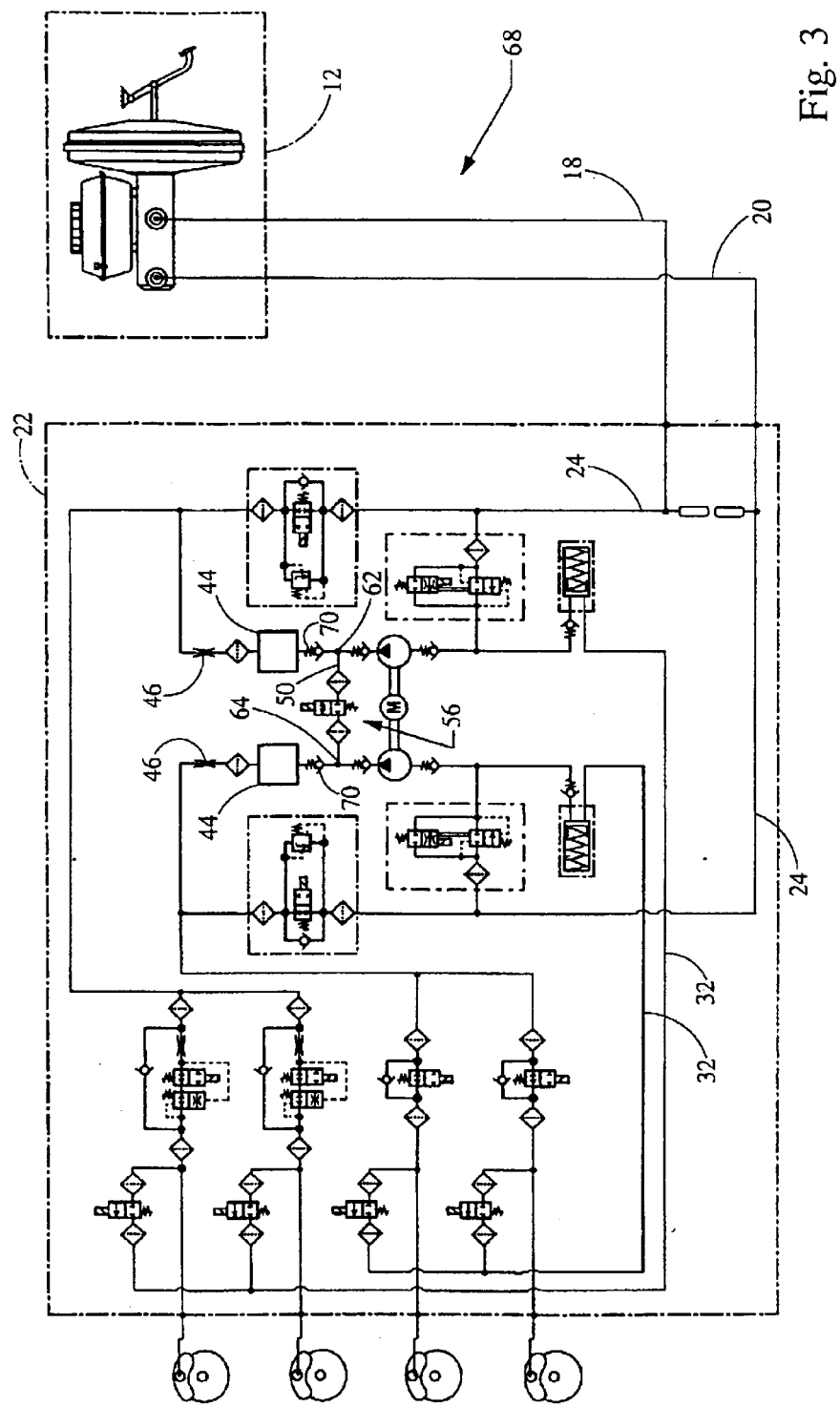
FIG. 3 is a schematic view of a third exemplary braking system in accordance with the invention, in which the shunting bypass line couples the pressure relief lines of the two braking circuits upstream of each circuit's damping chamber, and wherein system redundancy is provided by a check valve in the secondary circuit downstream of the damping chamber orifice.

With reference to FIG. 3, a third exemplary braking system 68, similar to that of FIG. 2, includes a pair of braking systems 18,20, the pressure relief lines 32 of which are likewise interconnected by a bypass line 50 at a respective bypass location 62,64 on each braking circuit 18,20 immediately downstream of the pump outlet 40, and upstream of the damping chamber 44 and throttling orifice 46. As in the second braking circuit 60, a normally-closed bypass valve 56 is disposed in the bypass line 50 to allow the controller to selectively interconnect the pressure relief lines 32 of the two braking circuits 18,20 to thereby provide rapid fluid pressure build-up and increased fluid flow in a selected braking circuit 18,20.

The third braking system 68 of FIG. 3 utilizes a pair of check valves 70 disposed in the respective pressure relief line 32 of each braking circuit 18,20 immediately downstream of the bypass locations 62,64. As with the check valve 66 of the second braking circuit 60, the check valves 70 of the third braking system 68 operate to ensure continued functionality of the second braking circuit 20, notwithstanding a leakage of fluid through a "closed" bypass valve 56.

Figure 4:
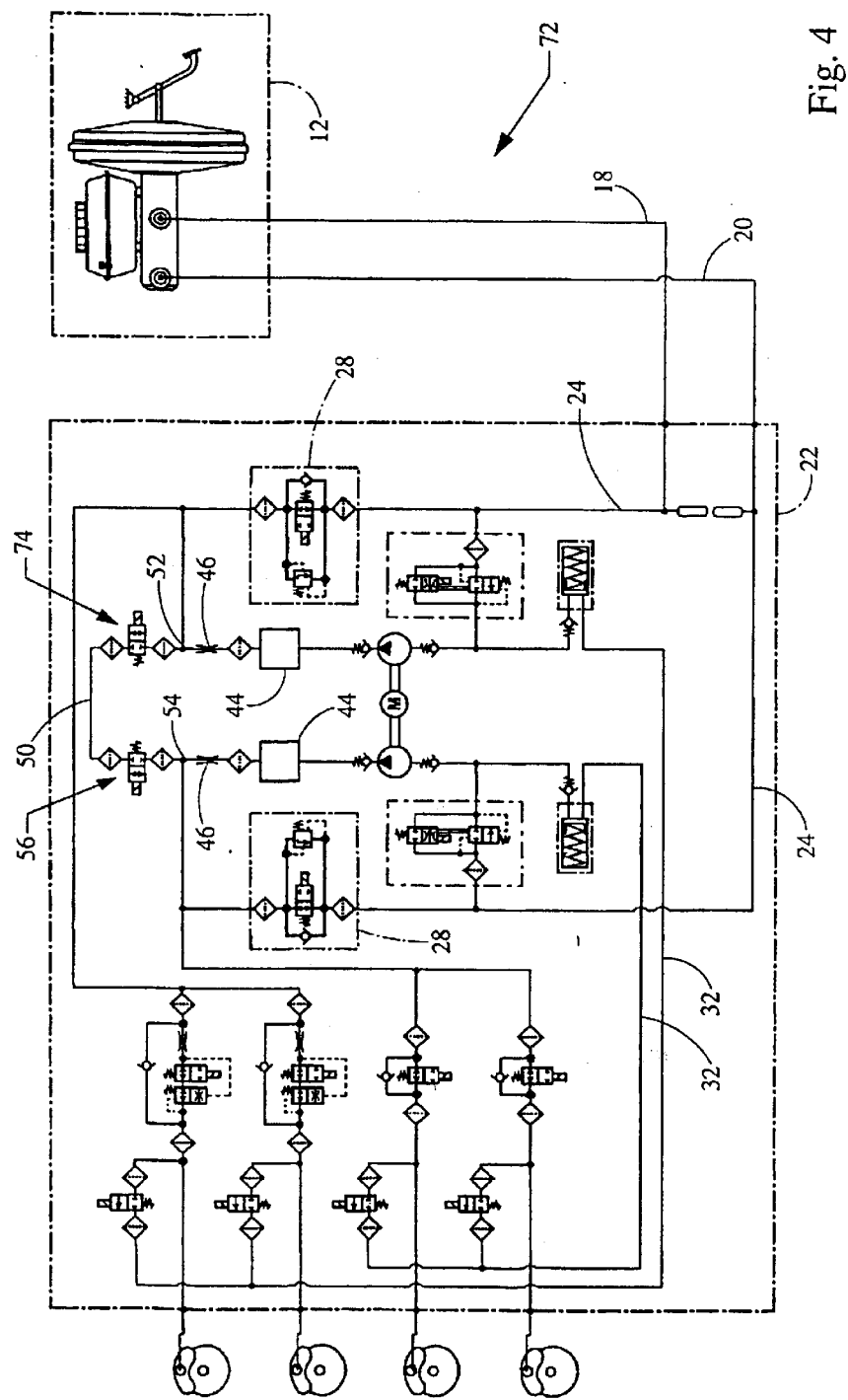
FIG. 4 is a schematic view of the fourth exemplary braking system in accordance with the invention, in which the shunting bypass line couples the pressure relief lines up to braking circuits downstream of each circuit's damping chamber orifice, and wherein system redundancy is provided by use of a second normally-closed valve in the bypass line.

A fourth exemplary braking system 72 is illustrated in FIG. 4. As in the first braking system 10, the fourth braking system 72 includes a pair of braking systems 18,20 whose pressure relief lines 32 are interconnected by a bypass line 50 at a respective bypass location 52,54 on each braking circuit 18,20 downstream of the pump outlet 40, the damping chamber 44, and the throttling orifice 46. And, as in the first braking circuit 10, a normally-closed bypass valve 56 in the bypass line 50 allows the controller to selectively interconnect the pressure relief lines 32 to thereby provide rapid fluid pressure build-up and increased fluid flow in a selected braking circuit 18,20.

Figure 5:
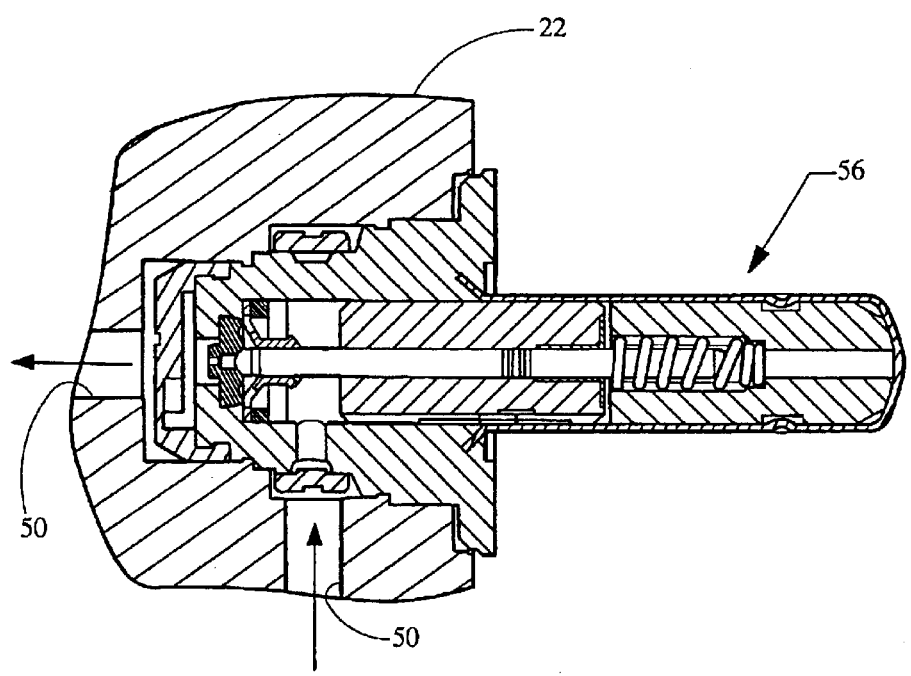
FIG. 5 is a view in cross-section of a normally-open electrically-operated valve suitable for use in the bypass line of the fourth exemplary braking system of FIG. 4.

To enhance braking system redundancy, the bypass line 50 of the fourth braking system 72 includes a second normally-closed electrically-operated bypass valve 74 connected in series with the first bypass valve 56. To further enhance braking system operation in the event of a bypass valve leakage, each of the bypass valves 56,74 of the fourth braking system 72 features a valve element that is hydraulically biased to a sealing position when a fluid pressure achieved at the bypass location 52,54 on one braking circuit 18,20 is greater than a fluid pressure achieved at the bypass location 52,54 on the other braking circuit 18,20. An exemplary bypass valve 56,74 for use with the fourth braking system is illustrated in FIG. 5.

The foregoing detailed description describes only a few of the many forms that the invention can take and should therefore be taken as illustrative rather than limiting. Thus, for example, while each of the disclosed braking systems 10,60,68,72 conveniently house the several components of both primary and secondary braking circuits 18,20, as well as those of the bypass line 50, within a hydraulic control unit 22, the invention contemplates any suitable packaging of the braking system's several components, including definition of the bypass line 50 externally of a housing that otherwise defines the system's primary and secondary circuits 18,20. Similarly, while the disclosed braking systems 10,60,68,72 each employ a tandem master cylinder 14 as the brake actuation unit 12, the invention contemplates any suitable driver-actuated fluid pressure generator, including suitable "brake-by-wire" systems, with which to generate a pair of pressurized fluid outputs in response to a braking signal.

We claim:

1. A hydraulic braking system for supplying a first and second pressurized fluid from a tandem master cylinder to a first and second wheel brake, the braking system comprising:

a first braking circuit including a first brake line receiving the first pressurized fluid from the master cylinder through a first normally-open isolation valve and selectively connected to the first wheel brake through a first normally-open inlet valve, and a first pressure relief line selectively receiving the first pressurized fluid from the first wheel brake through a first normally-closed outlet valve and connected to the first brake line upstream of the first inlet valve, wherein the first pressure relief line further includes a first pump having an outlet, and a first check valve preventing reverse flow through the first pump;

a second braking circuit including a second brake line receiving the second pressurized fluid from the master cylinder through a second normally-open isolation valve and selectively connected to a second wheel brake through a second normally-open inlet valve, and a second pressure relief line selectively receiving the second pressurized fluid from the second wheel brake through a second normally-closed outlet valve and connected to the second brake line upstream of the second inlet valve, wherein the second pressure relief line further includes a second pump having an outlet, and a second check valve preventing reverse flow through the second pump; and a bypass line connecting the first braking circuit to the second braking circuit, wherein the bypass line includes a first normally-closed electrically-operated bypass valve, and wherein the bypass line is connected to the first braking circuit at a bypass location downstream of the first pump outlet and the bypass line is connected to the second braking circuit at a bypass location downstream of the second pump outlet, wherein the first pressure relief line includes a first damping chamber downstream of the first pump outlet, and a second damping chamber downstream of the second pump outlet; and wherein the bypass location on the first braking circuit is upstream of the first damping chamber, and the bypass location on the second braking circuit is upstream of the second damping chamber.

2. A braking system according to claim 1, wherein the first pressure relief line includes a first throttling orifice downstream of the first pump outlet, and the second pressure relief line includes a second throttling orifice down stream of the second pump outlet; and wherein the bypass location on the first braking circuit is downstream of the first throttling orifice, and the bypass location on the second braking circuit is downstream of the second throttling orifice.

3. A braking system according to claim 1, wherein the first braking circuit further includes a first pressure transducer located downstream of the first pump outlet.

4. A braking system according to claim 3, wherein the second braking circuit further includes a second pressure transducer located downstream of the second pump outlet.

5. A braking system according to claim 1, wherein the bypass line further includes a second normally-closed electrically-operated bypass valve.

6. A hydraulic braking system for supplying a first and second pressurized fluid from a tandem master cylinder to a first and second wheel brake, the braking system comprising:

a first braking circuit including a first brake line receiving the fist pressurized fluid from the master cylinder through a first normally-open isolation valve and selectively connected to the first wheel brake through a first normally-open inlet valve, and a first pressure relief line selectively receiving the first pressurized fluid from the first wheel brake through a first normally-closed outlet valve and connected to the first brake line upstream of the first inlet valve, wherein the first pressure relief line further includes a first pump having an outlet, and a first check valve preventing reverse flow through the first pump;

a second braking circuit including a second brake line receiving the second pressurized fluid from the master cylinder through a second normally-open isolation valve and selectively connected to a second wheel brake through a second normally-open inlet valve, and a second pressure relief line selectively receiving the second pressurized fluid from the second wheel brake through a second normally-closed outlet valve and connected to the second brake line upstream of the second inlet valve, wherein the second pressure relief line further includes a second pump having an outlet, and a second check valve preventing reverse flow through the second pump;

a bypass line connecting the first braking circuit to the second braking circuit, wherein the bypass line includes a first normally-closed electrically-operated bypass valve, and wherein the bypass line is connected to the first braking circuit at a bypass location downstream of the first pump outlet and the bypass line is connected to the second braking circuit at a bypass location downstream of the second pump outlet; and a third check valve in the second pressure relief line downstream of the location on the second braking circuit to which the bypass line is connected, wherein the third check valve prevents reverse flow of second pressurized fluid from the second brake line through the bypass line into the first brake line.

7. A braking system according to claim 6, further including a fourth check valve in the first pressure relief line downstream of the location on the first braking circuit to which the bypass line is connected, wherein the fourth check valve prevents reverse flow of the first pressurized fluid from the first brake line through the bypass line into the second brake line.

8. A hydraulic braking system for supplying a first and second pressurized fluid from a tandem master cylinder to a first and second wheel brake, the braking system comprising:

a first braking circuit including a first brake line receiving the first pressurized fluid from the master cylinder through a first normally-open isolation valve and selectively connected to the first wheel brake through a first normally-open inlet valve, and a first pressure relief line selectively receiving the first pressurized fluid from the first wheel brake through a first normally-closed outlet valve and connected to the first brake line upstream of the first inlet valve, wherein the first pressure relief line further includes a first pump having an outlet, and a first check valve preventing reverse flow through the first pump;

a second braking circuit including a second brake line receiving the second pressurized fluid from the master cylinder through a second normally-open isolation valve and selectively connected to a second wheel brake through a second normally-open inlet valve, and a second pressure relief line selectively receiving the second pressurized fluid from the second wheel brake through a second normally-closed outlet valve and connected to the second brake line upstream of the second inlet valve, wherein the second pressure relief line further includes a second pump having an outlet, and a second check valve preventing reverse flow through the second pump; and a bypass line connecting the first braking circuit to the second braking circuit, wherein the bypass line includes a first normally-closed electrically-operated bypass valve, and wherein the bypass line is connected to the first braking circuit at a bypass location downstream of the first pump outlet and the bypass line is connected to the second braking circuit at a bypass location downstream of the second pump outlet, wherein the nonenergized first bypass valve includes a valve element that is hydraulically biased to a sealing position when a fluid pressure achieved at the bypass location on the first braking circuit is greater than a fluid pressure achieved at the bypass location on the second braking circuit.

9. A hydraulic braking system for supplying a first and second pressurized fluid from a tandem master cylinder to a first and second wheel brake, the braking system comprising:

a first braking circuit including a first brake line receiving the first pressurized fluid from the master cylinder through a first normally-open isolation valve and selectively connected to the first wheel brake through a first normally-open inlet valve, and a first pressure relief line selectively receiving the first pressurized fluid from the first wheel brake through a first normally-closed outlet valve and connected to the first brake line upstream of the first inlet valve, wherein the first pressure relief line further includes a first pump having an outlet, and a first check valve preventing reverse flow through the first pump;

a second braking circuit including a second brake line receiving the second pressurized fluid from the master cylinder through a second normally-open isolation valve and selectively connected to a second wheel brake through a second normally-open inlet valve, and a second pressure relief line selectively receiving the second pressurized fluid from the second wheel brake through a second normally-closed outlet valve and connected to the second brake line upstream of the second inlet valve, wherein the second pressure relief line further includes a second pump having an outlet, and a second check valve preventing reverse flow through the second pump; and a bypass line connecting the first braking circuit to the second braking circuit, wherein the bypass line includes a first normally-closed electrically-operated bypass valve, and wherein the bypass line is connected to the first braking circuit at a bypass location downstream of the first pump outlet and the bypass line is connected to the second braking circuit at a bypass location downstream of the second pump outlet, wherein the bypass line further includes a second normally-closed electrically-operated bypass valve, and wherein the nonenergized first bypass valve includes a valve element that is hydraulically biased to a sealing position when a fluid pressure achieved at the bypass location on the first braking circuit is greater than a fluid pressure achieved at the bypass location on the second braking circuit; and wherein the nonenergized second bypass valve includes a valve element that is hydraulically biased to a sealing position when the fluid pressure achieved at the bypass location on the second braking circuit is greater than the fluid pressure achieved at the bypass location on the first braking circuit.

10. A hydraulic braking system for supplying a first and second pressurized fluid from a tandem master cylinder to a first and second wheel brake, the braking system comprising:

a first and second braking circuit, each braking circuit having a brake line receiving pressurized fluid from the master cylinder through a normally-open isolation valve and selectively connected to a respective one of the wheel brakes through a normally-open inlet valve, each braking circuit further having a pressure relief line selectively receiving pressurized fluid from the respective one of the wheel brake's through a normally-closed outlet valve and connected to the brake line upstream of the inlet valve, the pressure relief line including in series pump having an outlet, and a check valve preventing reverse flow through the pump;

a bypass line interconnecting the first and second braking circuits at a respective bypass location on the pressure relief line of each circuit downstream of the pump outlet, wherein the bypass line includes a first normally-closed electrically-operated valve; and means for preventing a loss of fluid pressure in the second braking circuit upon detecting a leakage of pressurized fluid through the bypass line from the first circuit to the second circuit, wherein the means for preventing the loss of fluid pressure in the second braking circuit includes a third check valve located in the second braking circuit downstream of the bypass location.

11. A braking system according to claim 10, further including a pressure transducer detecting a fluid pressure achieved in the first braking circuit between the pump outlet and the inlet valve.

12. A braking system according to claim 10, further including a fourth check valve located in the first braking circuit downstream of the bypass location.

13. In a hydraulic braking system for supplying a first and second pressurized fluid from a tandem master cylinder to a first and second wheel brake, wherein the braking system includes a first and second braking circuit, each braking circuit having a brake line receiving pressurized fluid from the master cylinder through a normally-open isolation valve and selectively connected to a respective one of the wheel brakes through a normally-open inlet valve, and each braking circuit further having a pressure relief line selectively receiving pressurized fluid from the respective one of the wheel brakes through a normally-closed outlet valve and connected to the brake line upstream of the inlet valve, the pressure relief line including in series a pump having an outlet, and a check valve preventing reverse flow through the pump, a method for increasing an available flow of pressurized fluid to the first wheel brake upon operation of the isolation valve of the first braking circuit comprising:

shunting pressurized fluid, from a bypass location on the pressure relief line of the first braking circuit downstream of the pump outlet, to a bypass location on the pressure relief line of the second braking circuit downstream of the pump outlet.

14. A method according to claim 13, wherein shunting includes opening a normally-closed electrically-operated bypass valve disposed in a bypass line connecting the respective bypass locations of each braking circuit.

15. A method according to claim 14, further including detecting a leakage through the bypass line between the first and second braking circuits when the bypass valve is in a closed condition.

16. A method according to claim 15, wherein detecting includes sensing a fluid pressure achieved in one of the braking circuits between the pump outlet and the inlet valve.

17. A method according to claim 16, wherein sensing is performed after the bypass valve returns to a closed condition.

18. In a hydraulic braking system for supplying a first and second pressurized fluid from a tandem master cylinder to a first and second wheel brake, wherein the braking system includes a first and second braking circuit, each braking circuit having a brake line receiving pressurized fluid from the master cylinder through a normally-open isolation valve and selectively connected to a respective one of the wheel brakes through a normally-open inlet valve, and each braking circuit further having a pressure relief line selectively receiving pressurized fluid from the respective one of the wheel brakes through a normally-closed outlet valve and connected to the brake line upstream of the inlet valve, the pressure relief line including in series a pump having an outlet, and a check valve preventing reverse flow through the pump, a method comprising:

closing the isolation valve of the first braking circuit; and interconnecting the first and second braking circuits at a respective bypass location on the pressure relief line of each braking circuit downstream of the pump outlet to thereby shunt pressurized fluid from the pressure relief line of the first braking circuit to the pressure relief line of the second braking circuit.

19. A method according to claim 18, wherein interconnecting includes opening a normally-closed electrically-operated valve disposed in a bypass line connecting the respective bypass locations of each circuit.

20. A method according to claim 18, further including detecting a leakage through the bypass line between the first and second braking circuits when the bypass valve is in a closed condition.

21. A method according to claim 20, wherein detecting includes sensing a fluid pressure achieved in one of the braking circuits between the pump outlet and the inlet valve.

22. A method according to claim 18, further including sensing is performed after the bypass valve returns to a closed condition.

23. A method according to claim 18, further including determining a braking system condition requiring a rapid pressure build-up of hydraulic fluid in the first braking circuit.

* * * * *